(12) United States Patent
Yang

(10) Patent No.: US 7,236,376 B2
(45) Date of Patent: Jun. 26, 2007

(54) CONTROLLER FOR REGULATING OUTPUT CURRENT AT THE PRIMARY SIDE OF A POWER SUPPLY

(75) Inventor: Ta-Yung Yang, Milpitas, CA (US)

(73) Assignee: System General Corp., Taipei Hsien (TW)

( * ) Notice: Subject to any disclaimer, the term of this patent is extended or adjusted under 35 U.S.C. 154(b) by 0 days.

(21) Appl. No.: 11/280,232

(22) Filed: Nov. 17, 2005

(65) Prior Publication Data

US 2007/0109821 A1 May 17, 2007

(51) Int. Cl.
H02M 3/335 (2006.01)

(52) U.S. Cl. .............. 363/21.04; 363/21.07; 363/21.1

(58) Field of Classification Search ............ 363/21.04, 363/21.05, 21.07, 21.09, 21.1, 21.11, 41, 363/97
See application file for complete search history.

(56) References Cited

U.S. PATENT DOCUMENTS 5,012,401 A * 4/1991 Barlage ..................... 363/97
5,940,281 A * 8/1999 Wolf ....................... 363/21.08
7,057,907 B2 * 6/2006 Oh ......................... 363/21.05

* cited by examiner

Primary Examiner—Bao Q. Vu
(74) Attorney, Agent, or Firm—Rosenberg, Klein & Klein

(57) ABSTRACT

A controller controlling the output current at the primary side of a power supply is provided. A waveform detector generates a current-waveform signal. A second control circuit generates an oscillation signal for determining the switching frequency of a switching signal. An integrator generates an integrated signal by integrating an average current signal with a time signal. The average current signal is generated in response to the current-waveform signal. The time signal is generated in accordance with said oscillation signal. The time constant of the integrator is correlated with the switching period of the switching signal, therefore the integrated signal is proportional to the output current. A first control circuit generates the switching signal in correlated with the integrated signal, the oscillation signal and a reference voltage. Wherein the first control circuit controls the pulse width of the switching signal. Therefore, the output current of the power supply can be regulated.

18 Claims, 11 Drawing Sheets

US 7,236,376 B2

CONTROLLER FOR REGULATING OUTPUT CURRENT AT THE PRIMARY SIDE OF A POWER SUPPLY

BACKGROUND OF THE INVENTION

1. Field of the Invention

The present invention relates to a power supply, and more particularly, to the controller of the power supply.

2. Description of Related Art

Various power supplies have been widely used to provide regulated voltage and current. For safety reasons, galvanic isolation is provided between a primary side and a secondary side of an off-line power supply. In case that the controller is configured at the primary side of the power supply, it would be difficult to control an output current of the power supply. Thus it is desirable to provide a controller for controlling the output current of the power supply at the primary side of the power supply.

SUMMARY OF THE INVENTION

The present invention provides a controller for controlling an output current at a primary side of a power supply. The controller comprises a first control circuit for generating a switching signal for switching a transformer of the power supply and regulating an output of the power supply. The first control circuit includes an error amplifier for output current control, a comparator associated with a PWM circuit controlling the pulse width of the switching signal in response to the output signal of the error amplifier.

The controller further comprises a second control circuit generates an oscillation signal for determining the switching frequency of the switching signal. A waveform detector generates a current-waveform signal by sampling a primary side switching current signal of the power supply. An integrator produces an integrated signal by integrating an average current signal with a time signal. The time signal is generated in accordance with the oscillation signal. The integrated signal is transmitted to the input of the error amplifier. Therefore, the output current of the power supply is regulated.

The average current signal is produced in response to the current-waveform signal, and the time constant of the integrator is correlated with a switching period of the switching signal. Therefore the integrated signal is proportional to the output current of the power supply.

DESCRIPTION OF THE PREFERRED EMBODIMENTS

Figure 1:
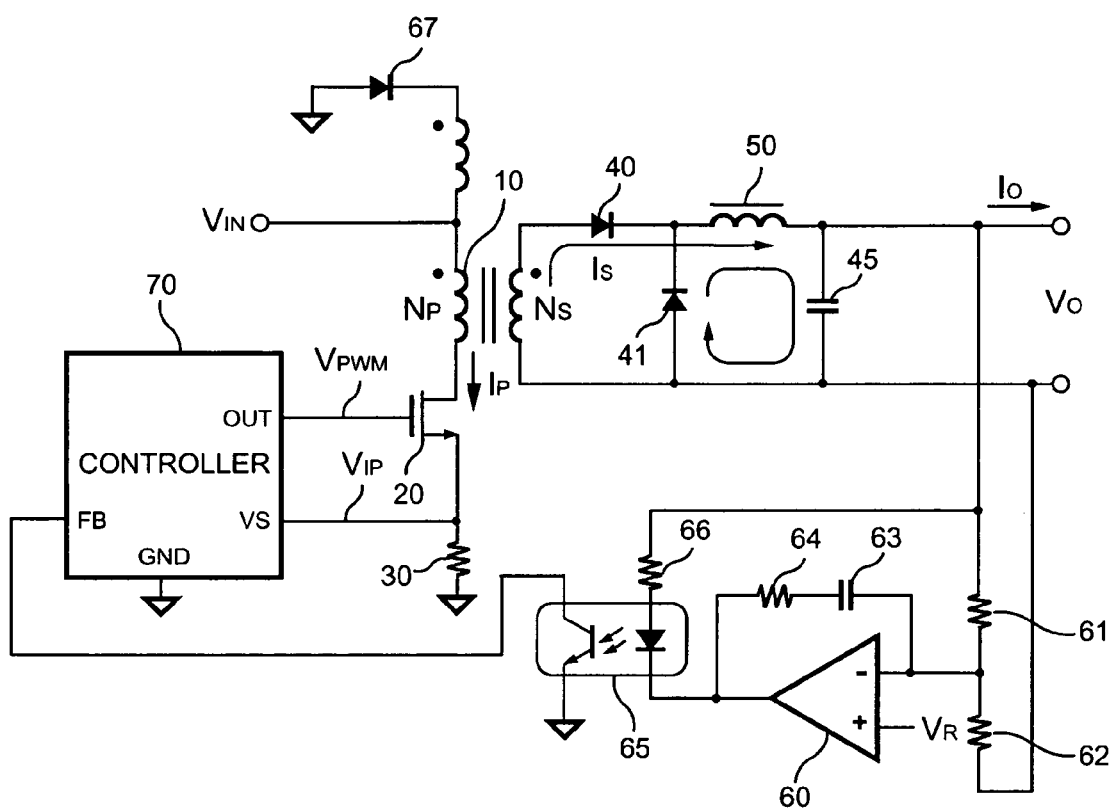
FIG. 1 shows a circuit diagram of a power supply according to one embodiment of the present invention.

Referring to FIG. 1, a power supply circuit is illustrated. The power supply comprises a transformer 10 having a primary winding $N_P$ and a secondary winding $N_S$. In order to regulate the output voltage $V_O$ or the output current $I_O$ of the power supply, a controller 70 generates a switching signal $V_{PWM}$ to switch the transformer 10 by switching a power transistor 20. The transformer 10 thus transfers the energy to the output of the power supply via rectifiers 40, 41, an inductor 50 and a capacitor 45. Through resistors 61, 62, an error amplifier 60 and an optical coupler 65, the output voltage $V_O$ is coupled to a feedback terminal FB of the controller 70 for developing a voltage feedback loop. A capacitor 63 and a resistor 64 are coupled between a negative input and an output of the error amplifier 60. A resistor 66 is coupled between the optical coupler 65 and the output of the power supply. A diode 67 is coupled between the primary side of the power supply and the ground. A primary side switching current $I_P$ is generated as the switching signal $V_{PWM}$ becomes high. A peak value $I_{PA}$ of the primary side switching current $I_P$ is given by, $$I_{PA} = \frac{T_{NS}}{T_{NP}} \times \left\{ \frac{\left[\left(\frac{T_{NS}}{T_{NP}} \times V_{IN}\right) - V_O - V_F\right]}{L_{50}} \times T_{ON} \right\} + \left(\frac{V_{IN}}{L_P} \times T_{ON}\right) \quad (1)$$

where $T_{NP}$ and $T_{NS}$ are respectively the winding turns of the primary winding $N_P$ and the secondary winding $N_S$ of the transformer 10; $V_{IN}$ is an input voltage, $V_O$ is the output voltage of the power supply, $V_F$ is the voltage drop of the rectifier 40, $L_{50}$ is the inductance of the inductor 50, $T_{ON}$ is an on-time of the switching signal $V_{PWM}$, $L_P$ is the magnetizing inductance of the primary winding $N_P$ of the transformer 10; in which the $L_P$ is large, therefore the current caused by the $(V_{IN}/L_P) \times T_{ON}$ can be ignored.

Figure 2:
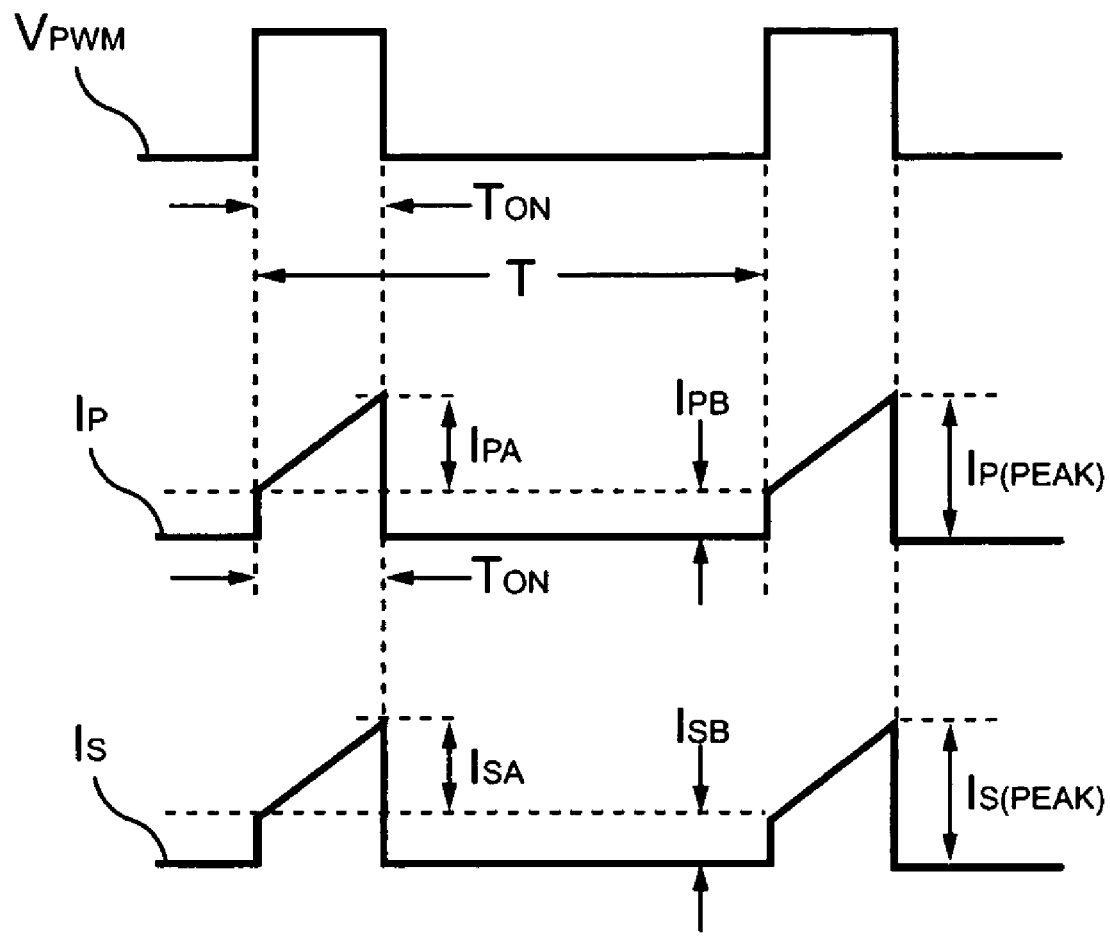
FIG. 2 shows the waveforms of the power supply according to one embodiment of the present invention.

A current-sense resistor 30 is coupled from a source of the power transistor 20 to a ground reference level for converting the primary side switching current $I_P$ to a primary side switching current signal $V_{IP}$. A current-sense terminal VS of the controller 70 is coupled to a current-sense device such as a current-sense resistor 30 for detecting the primary side switching current signal $V_{IP}$. Referring to FIG. 2, it shows the waveforms of the switching currents $I_P$, $I_S$ of the power supply. A secondary side switching current $I_S$ can be expressed by, $$I_S = \frac{T_{NP}}{T_{NS}} \times I_P \quad (2)$$

A peak value $I_{P(PEAK)}$ of the primary side switching current $I_P$ and a peak value $I_{S(PEAK)}$ of the secondary side switching current $I_S$ are given by, $$I_{P(PEAK)} = I_{PA} + I_{PB} \quad (3)$$

$$I_{S(PEAK)} = I_{SA} + I_{SB} \quad (4)$$

$$I_{SA} = \frac{T_{NP}}{T_{NS}} \times I_{PA} \quad (5)$$

$$I_{SB} = \frac{T_{NP}}{T_{NS}} \times I_{PB} \quad (6)$$

where $I_{PA}$ and $I_{PB}$ represent the continuous energy stored in the inductor 50, which is not fully discharged during the turn off period of the switching signal $V_{PWM}$. The continuous energy features that the energy of the inductor 50 is not fully released as the next switching cycle starts.

Figure 3:
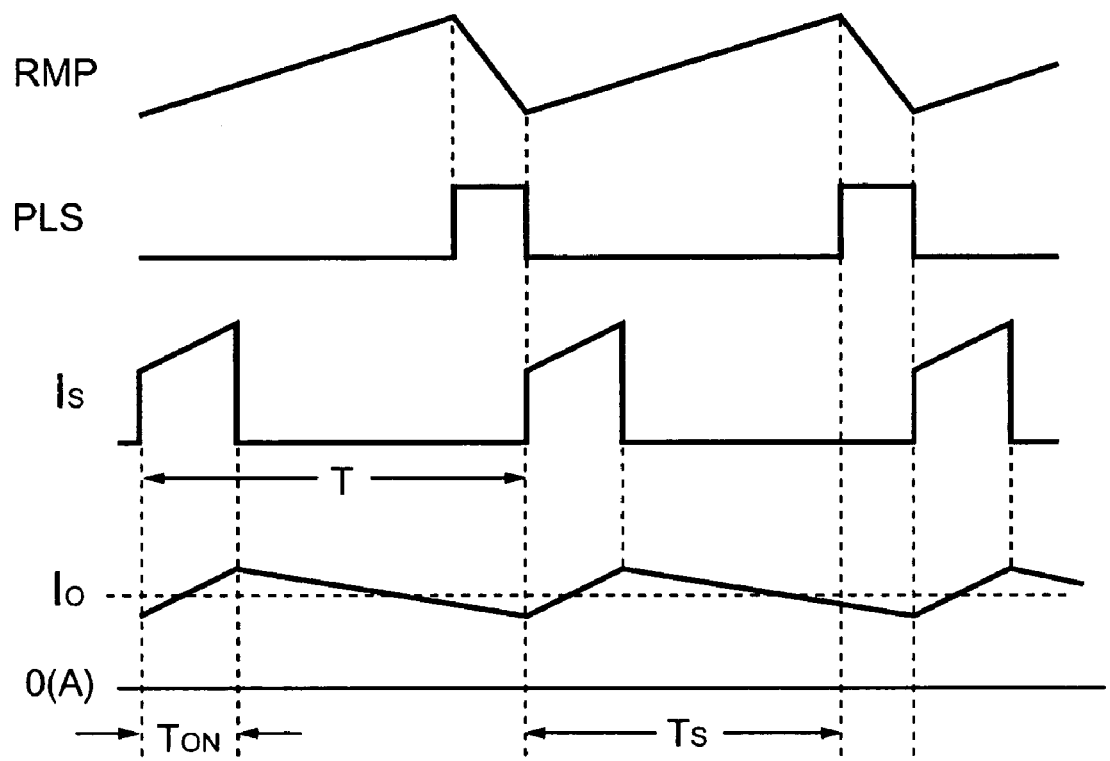
FIG. 3 shows the waveforms related to the output current of the power supply according to one embodiment of the present invention.

FIG. 3 further shows the output current $I_O$ of the power supply is related to the waveform of the switching currents $I_S$. The output current $I_O$ of the power supply is the average of the secondary side switching current $I_S$. The output current $I_O$ of the power supply can be expressed by, $$I_O = \left[ I_{SB} + \left( I_{SA} \times \frac{1}{2} \right) \right] \times \frac{T}{T_S} \quad (7)$$

where $T_S$ represents an integrated period of the switching current base on the switching period T. The output current $I_O$ of the power supply can therefore be regulated in accordance with the primary side switching current $I_P$.

Figure 4:
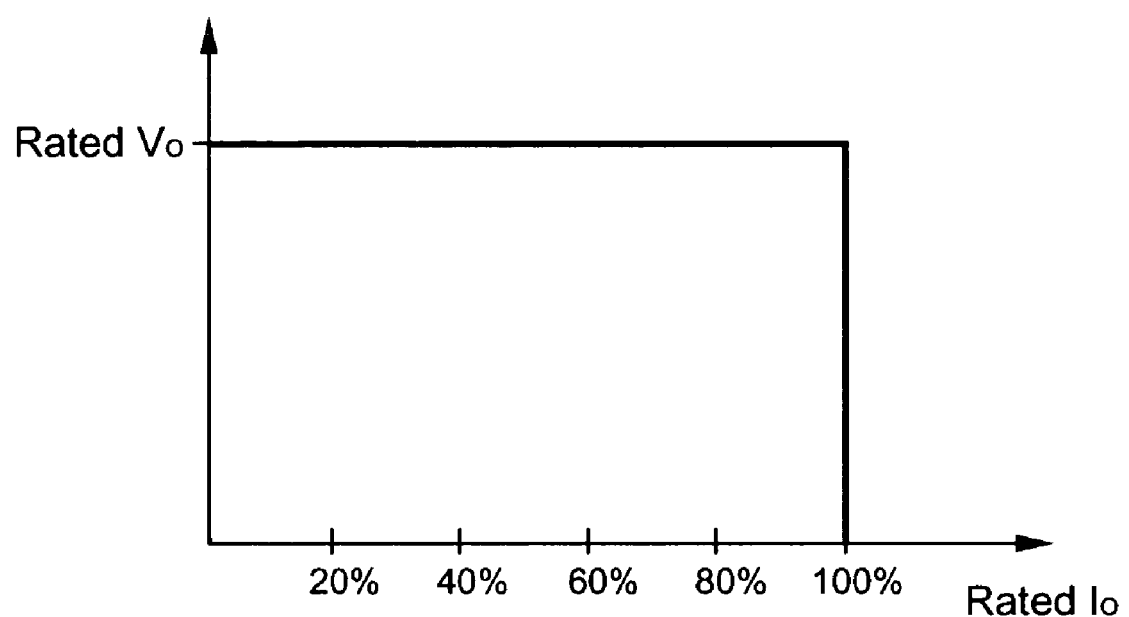
FIG. 4 shows a curve of the output voltage versus the variation of the output current according to one embodiment of the present invention.
Figure 5:
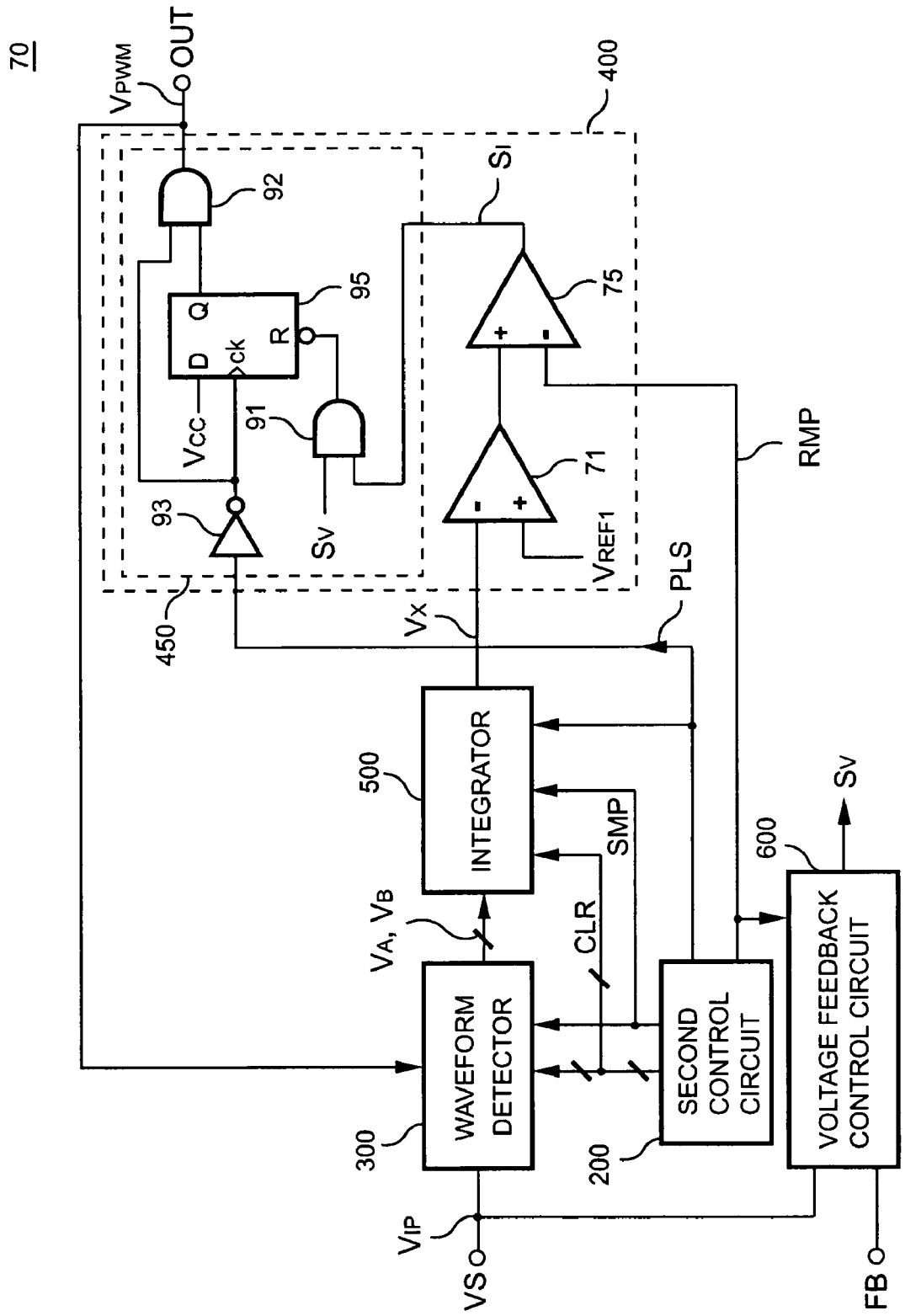
FIG. 5 shows a circuit diagram of a controller for output current control according to one embodiment of the present invention.

FIG. 4 shows a curve of the output voltage $V_O$ versus the variation of the output current $I_O$, in which the output current $I_O$ is controlled as a constant current source. Referring to FIG. 5, it illustrates a circuit diagram of the controller 70 for output current control according to one embodiment of the present invention. A first circuit, which is a waveform detector 300, is coupled to the current-sense terminal VS to generate a first signal by sampling the primary side switching current signal $V_{IP}$. The first signal includes a first-A signal and a first-B signal. The first-A signal and the first-B signal are a first current-waveform signal $V_A$ and a second current-waveform signal $V_B$. A second control circuit 200 generates a fourth signal, which is an oscillation signal PLS, to determine the switching frequency of the switching signal $V_{PWM}$.

A second circuit, which is an integrator 500, is used to generate a second signal by integrating an average current signal $I_{AVG}$. The second signal is an integrated signal $V_X$. The average current signal $I_{AVG}$ is produced in response to the first current-waveform signal $V_A$ and the second current-waveform signal $V_B$. A time constant of the integrator 500 is correlated with a switching period T of the switching signal $V_{PWM}$. The integrated signal $V_X$ is therefore proportional to the output current $I_O$ of the power supply. A first control circuit 400 is used to generate a third signal that is the switching signal $V_{PWM}$. The first control circuit 400 includes an operational amplifier 71 and a first reference voltage $V_{REF1}$ developing an error amplifier for output current control, a first comparator 75 associated with a PWM circuit 450 controlling the pulse width of the switching signal $V_{PWM}$ in response to an output signal of the error amplifier. The error amplifier amplifies the integrated signal $V_X$ and provides a loop gain for output current control. A current control loop is formed from detecting the primary side switching current $I_P$ to modulate the pulse width of the switching signal $V_{PWM}$. The current control loop controls the magnitude of the primary side switching current $I_P$ in response to the first reference voltage $V_{REF1}$. The secondary side switching current $I_S$ is a ratio of the primary side switching current $I_P$ as shown in equation (2).

The primary side switching current $I_P$ is converted to the primary side switching current signal $V_{IP}$ by the current-sense resistor 30. The waveform detector 300 detects the primary side switching current signal $V_{IP}$ and generates the first current-waveform signal $V_A$ and the second current-waveform signal $V_B$. The integrator 500 generates the integrated signal $V_X$ in response to the first current-waveform signal $V_A$ and the second current-waveform signal $V_B$. The integrated signal $V_X$ is designed by, $$V_X = \left( V_B + \frac{V_A - V_B}{2} \right) \times \frac{T_S}{T_1} \quad (8)$$

where $V_A$ and $V_B$ can be expressed, $$V_A = \frac{T_{NS}}{T_{NP}} \times R_S \times (I_{SA} + I_{SB}) \quad (9)$$

$$V_B = \frac{T_{NS}}{T_{NP}} \times R_S \times I_{SB} \quad (10)$$

where the $T_1$ is the time constant of the integrator 500, $R_S$ is the resistance of the current-sense resistor 30.

Referring to equations (7)–(10), the integrated signal $V_X$ can be rewritten as, $$V_X = k1 \times \frac{T_S}{T_1} \times \frac{T_{NS}}{T_{NP}} \times R_S \times I_O \quad (11)$$

where the k1 is a constant of Ts/T.

It is noted that the integrated signal $V_X$ is proportional to the output current $I_O$ of the power supply. The integrated signal $V_X$ increases whenever the output current $I_O$ increases. However, the maximum value of the integrated signal $V_X$ is limited to the value of the first reference voltage $V_{REF1}$ through the regulation of the current control loop. Under feedback control of the current control loop, a maximum output current $I_{O(MAX)}$ is given by, $$I_{O(MAX)} = \frac{T_{NP}}{T_{NS}} \times \frac{G_A \times G_{SW} \times V_{R1}}{1 + \left( G_A \times G_{SW} \times \frac{R_S}{K} \right)} \quad (12)$$

where K is a constant and equal to $T_1/T$, $V_{R1}$ is the value of the first reference voltage $V_{REF1}$, $G_A$ is the gain of the error amplifier, and $G_{SW}$ is the gain of the first control circuit 400.

If the loop gain of the current control loop is high ($G_A \times G_{SW} \gg 1$), the maximum output current $I_{O(MAX)}$ could be given by, $$I_{O(MAX)} = K \times \frac{T_{NP}}{T_{NS}} \times \frac{V_{R1}}{R_S} \qquad (13)$$

The maximum output current $I_{O(MAX)}$ of the power supply is thus regulated as a constant current in accordance with the first reference voltage $V_{REF1}$. The PWM circuit 450 is coupled to the output terminal OUT of the controller 70 to output the switching signal $V_{PWM}$ for switching the power supply. The PWM circuit 450 according to one embodiment of the present invention comprises a D flip-flop 95, an inverter 93, an AND gate 91 and an AND gate 92. A D input of the D flip-flop 95 is supplied with a supply voltage $V_{CC}$. The oscillation signal PLS sets the D flip-flop 95 through the inverter 93. An input of the inverter 93 is coupled to the second control circuit 200. An output of the inverter 93 is coupled to a set input of the D flip-flop 95. An output of the D flip-flop 95 is coupled to a first input of the AND gate 92. A second input of the AND gate 92 is coupled to the output of the inverter 93. An output of the AND gate 92 is also an output of the PWM circuit 450, which generates the switching signal $V_{PWM}$. The D flip-flop 95 is reset by an output of the AND gate 91. An output of the AND gate 91 is coupled to the reset input of the D flip-flop 95. A first input of the AND gate 91 is supplied with a voltage-loop signal $S_V$. The voltage-loop signal $S_V$ is generated by a voltage feedback control circuit 600. The voltage feedback control circuit 600 is utilized to regulate the output voltage $V_O$ of the power supply. A current-loop signal $S_I$ is a reset signal that is generated from an output of the first comparator 75 is supplied to a second input of the AND gate 91 for achieving output current control. A positive input of the first comparator 75 is coupled to an output of the operational amplifier 71. A negative input of the first comparator 75 is supplied with the ramp signal RMP that is provided by the second control circuit 200. The voltage-loop signal $S_V$ and the current-loop signal $S_I$ can reset the D flip-flop 95 for shorten the pulse width of the switching signal $V_{PWM}$ so as to regulate the output voltage $V_O$ and the output current $I_O$.

Figure 6:
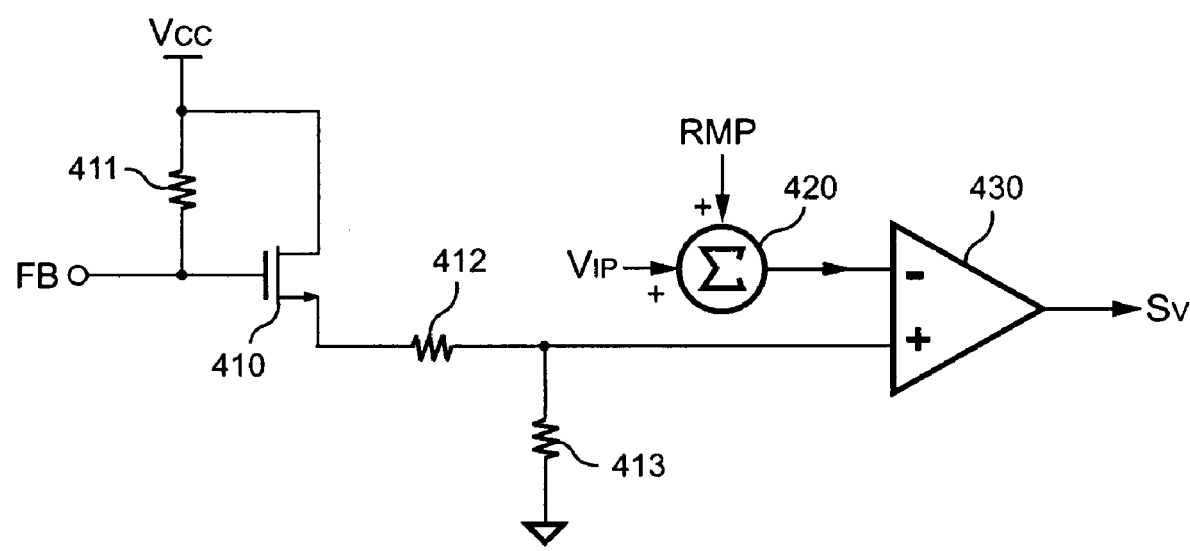
FIG. 6 shows a circuit diagram of a voltage feedback control circuit according to one embodiment of the present invention.

FIG. 6 shows a circuit diagram of a voltage feedback control circuit 600. As shown in the figure, the voltage feedback control circuit 600 comprises a transistor 410, three resistors 411, 412, 413, a summing circuit 420, and a comparator 430. The gate of the transistor 410 is connected to the feedback terminal FB. The resistor 411 is coupled between the supply voltage $V_{CC}$, the drain of the transistor 410 and the gate of the transistor 410. The resistor 412 is coupled to the source of the transistor 410. The resistor 413 is coupled between the resistor 412 and the ground. A positive input of the comparator 430 is connected to the feedback terminal FB through the transistor 410 and resistors 412, 413 for level shift and attenuation. A negative input of the comparator 430 is coupled to an output of the summing circuit 420 to receive the sum of the ramp signal RMP and the primary side switching current signal $V_{IP}$. The summing circuit 420 is applied to add the primary side switching current signal $V_{IP}$ with the ramp signal RMP for the slope compensation. The voltage-loop signal $S_V$ is thus generated from an output of the comparator 430 for the voltage loop control and regulating the output voltage $V_O$ of the power supply.

Figure 7:
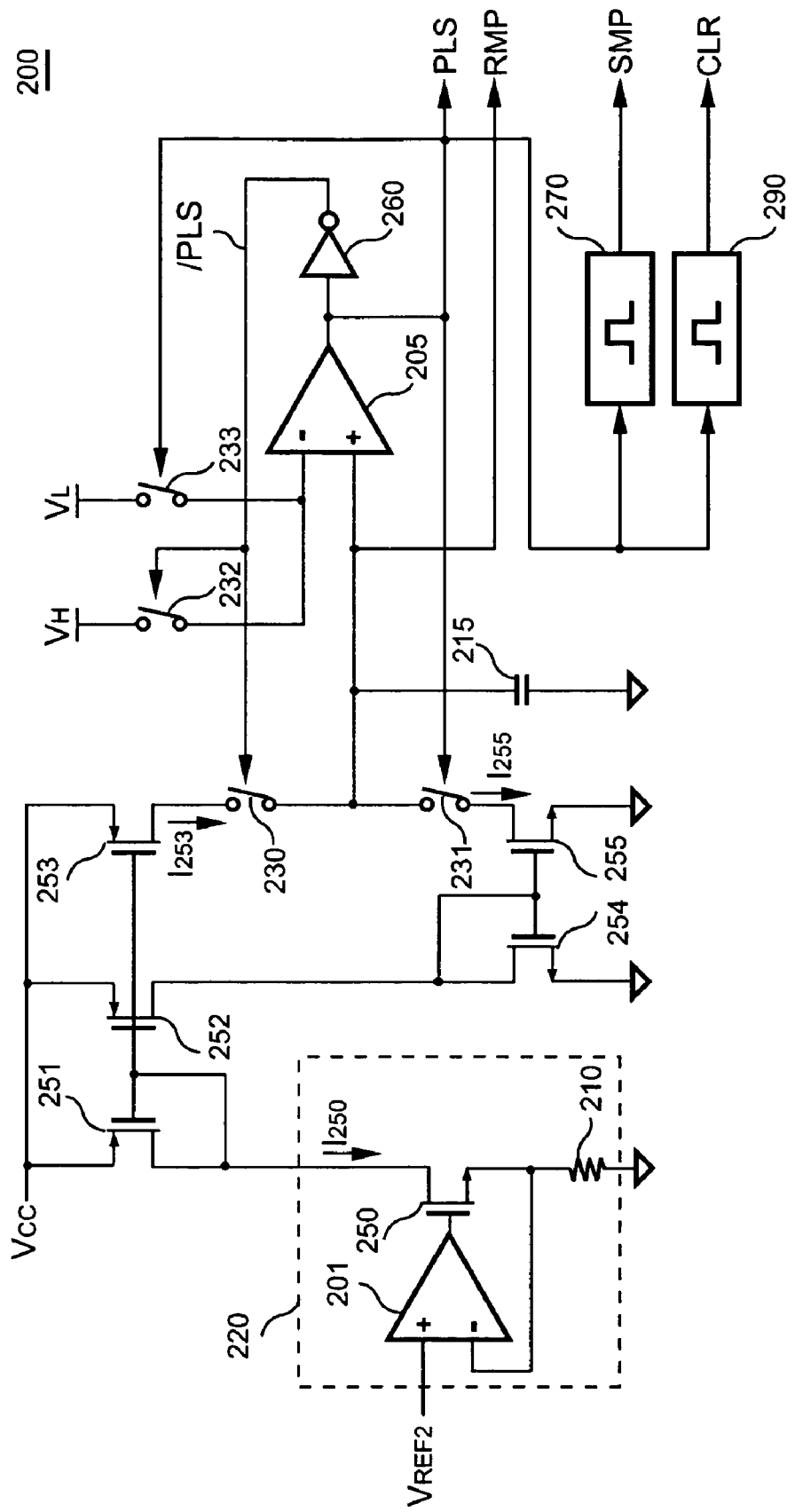
FIG. 7 shows a circuit diagram of a second control circuit according to one embodiment of the present invention.

Referring to FIG. 7, it illustrates a circuit diagram of the second control circuit 200 according to one embodiment of the present invention. A third V-to-I converter 220 includes an third timing operational amplifier 201, a third timing resistor 210 and a third timing transistor 250. The third V-to-I converter 220 generates a reference current $I_{250}$ in response to a second reference voltage $V_{REF2}$. A positive input of the third timing operational amplifier 201 is supplied with the second reference voltage $V_{REF2}$. A negative input of the third timing operational amplifier 201 is connected to the source of the third timing transistor 250. An output of the third timing operational amplifier 201 is coupled to the gate of the third timing transistor 250. The drain of the third timing transistor 250 outputs the reference current $I_{250}$. The third timing resistor 210 is coupled between the source of the third timing transistor 250 and the ground. A sixth current mirror includes transistors 251, 252, 253 for generating a second control circuit charge current $I_{253}$ in response to the reference current $I_{250}$. The sources of the transistors 251, 252, 253 are coupled to the supply voltage $V_{CC}$. The gates of the transistors 251, 252, 253 and the drain of the transistor 251 are coupled together. The drain of the transistor 251 is coupled to the drain of the third timing transistor 250. The drain of the transistor 253 generates the second control circuit charge current $I_{253}$. A seventh current mirror includes transistors 254, 255 for generating a second control circuit discharge current $I_{255}$ in response to the reference current $I_{250}$. The sources of the transistors 254, 255 are coupled to the ground. The gates of the transistors 254, 255 and the drain of the transistor 254 are coupled together. The drain of the transistor 254 is coupled to the drain of the transistor 252. The drain of the transistor 255 generates the second control circuit discharge current $I_{255}$.

A seventh switch 230 is coupled between the drain of the transistor 253 and a fifth capacitor 215. An eighth switch 231 is coupled between the drain of the transistor 255 and the fifth capacitor 215. The ramp signal RMP is obtained across the fifth capacitor 215. A third comparator 205 has a positive input connected to the fifth capacitor 215. An output of the third comparator 205 outputs the oscillation signal PLS. The oscillation signal PLS determines the switching frequency of the switching signal $V_{PWM}$. A first terminal of a ninth switch 232 is supplied with a high-threshold voltage $V_H$. A first terminal of a tenth switch 233 is supplied with a low-threshold voltage $V_L$. A second terminal of the ninth switch 232 and a second terminal of the tenth switch 233 are both coupled to a negative input of the third comparator 205. An input of an inverter 260 is coupled to an output of the third comparator 205 for generating an inverse fourth signal that is an inverse oscillation signal /PLS. The oscillation signal PLS turns on/off the eighth switch 231 and the tenth switch 233. The inverse oscillation signal /PLS turns on/off the seventh switch 230 and the ninth switch 232. The resistance $R_{210}$ of the third timing resistor 210 and the capacitance of the fifth capacitor 215 determine the switching period T of the switching signal $V_{PWM}$.

$$T = \frac{C_{215} \times V_{OSC}}{V_{REF2}/R_{210}} = R_{210} \times C_{215} \times \frac{V_{OSC}}{V_{REF2}} \qquad (14)$$

where $V_{OSC} = V_H - V_L$ and $C_{215}$ is the capacitance of the fifth capacitor 215.

The oscillation signal PLS is further coupled to a first pulse generator 270 and a second pulse generator 290 to generate a sample signal SMP and a clear signal CLR for the waveform detector 300 and the integrator 500.

Figure 8:
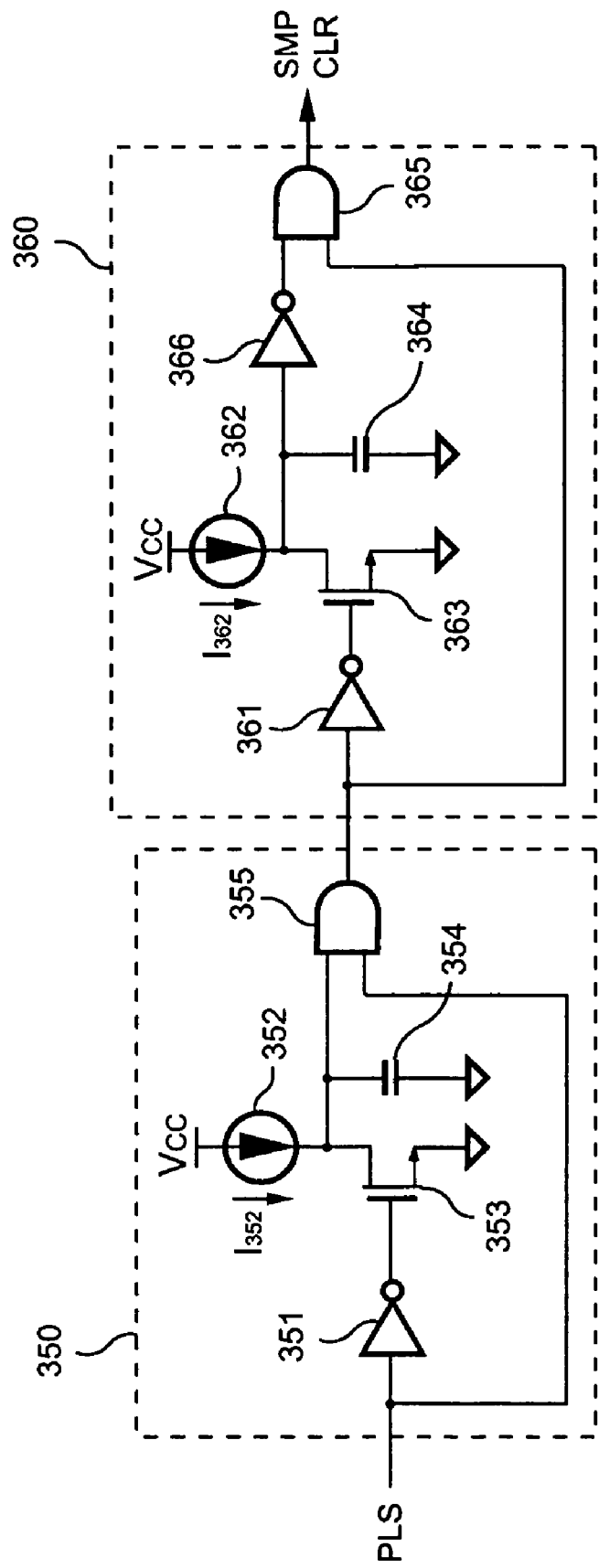
FIG. 8 shows a circuit diagram of a pulse generator according to one embodiment of the present invention.

FIG. 8 illustrates the circuit diagram of the pulse generator according to one embodiment of the present invention. As shown in the figure, the pulse generator comprises a time-delay circuit 350 and a one-shot signal generator 360. The output of the pulse generator is a one-shot signal. The time-delay circuit 350 includes an inverter 351, a constant current source 352, a transistor 353, a capacitor 354, and an AND gate 355. An input of the inverter 351 receives an input signal that is the oscillation signal PLS. An output of the inverter 351 is coupled to the gate of the transistor 353. The constant current source 352 is connected between the drain of the transistor 353 and the supply voltage $V_{CC}$. The source of the transistor 353 is coupled to the ground. The capacitor 354 is connected between the drain of the transistor 353 and the ground. An input of the AND gate 355 is connected to the capacitor 354. Another input of the AND gate 355 receives the oscillation signal PLS. A current $I_{352}$ of the constant current source 352 and the capacitance of the capacitor 354 determine the timing of the propagation delay.

The one-shot signal generator 360 includes an inverter 361, a constant current source 362, a transistor 363, a capacitor 364, an AND gate 365 and an inverter 366. An output of the time-delay circuit 350 is coupled to an input of the one-shot signal generator 360. An input of the inverter 361 is coupled to the output of the AND gate 355. An output of the inverter 361 is coupled to the gate of the transistor 363. The constant current source 362 is connected between the drain of the transistor 363 and the supply voltage $V_{CC}$. The source of the transistor 363 is coupled to the ground. The capacitor 364 is connected between the drain of the transistor 363 and the ground. An input of the inverter 366 is connected to the capacitor 364. An output of the inverter 366 is coupled to an input of the AND gate 365. Another input of the AND gate 365 is coupled to the output of the AND gate 355. An output of the AND gate 365 outputs the one-shot signal that is the sample signal SMP or the clear signal CLR. A current $I_{362}$ of the constant current source 362 and the capacitance of the capacitor 364 determine the pulse width of the one-shot signal that is the sample signal SMP or the clear signal CLR.

Figure 9:
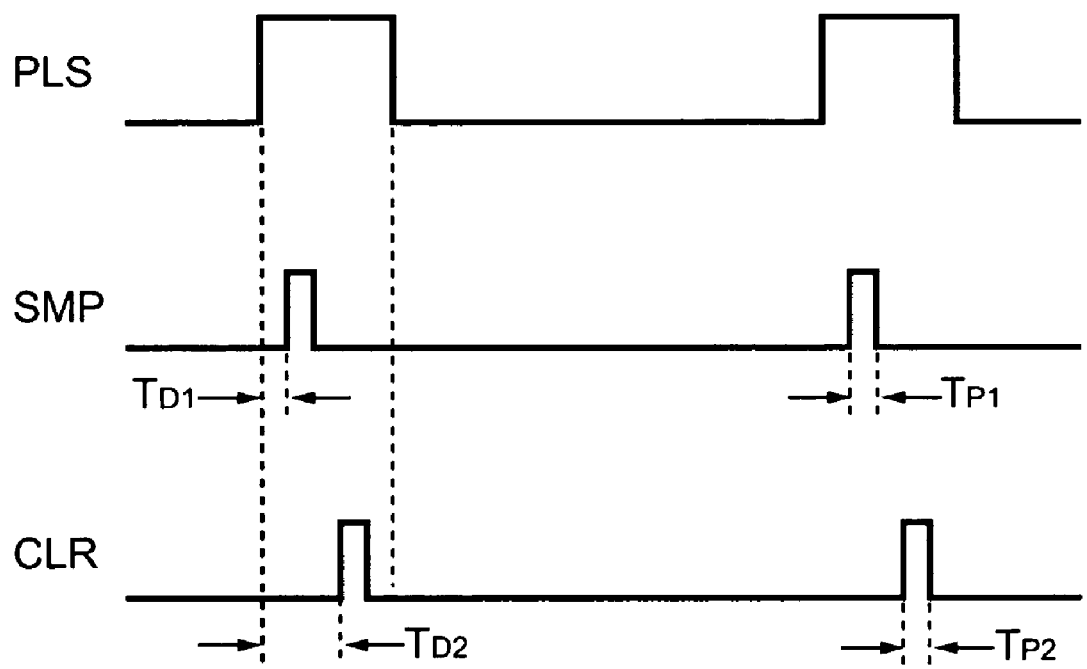
FIG. 9 shows the waveforms of the second control circuit according to one embodiment of the present invention.

The sample signal SMP and the clear signal CLR are shown in FIG. 9, in which a first delay time $T_{D1}$ is produced by the first pulse generator 270 in response to the rising edge of the oscillation signal PLS. After that, the sample signal SMP is generated as a one-shot signal having a first pulse width $T_{P1}$. In the mean time, the rising edge of the oscillation signal PLS drives the second pulse generator 290 to produce a second delay time $T_{D2}$ and generates the clear signal CLR with a second pulse width $T_{P2}$.

Figure 10:
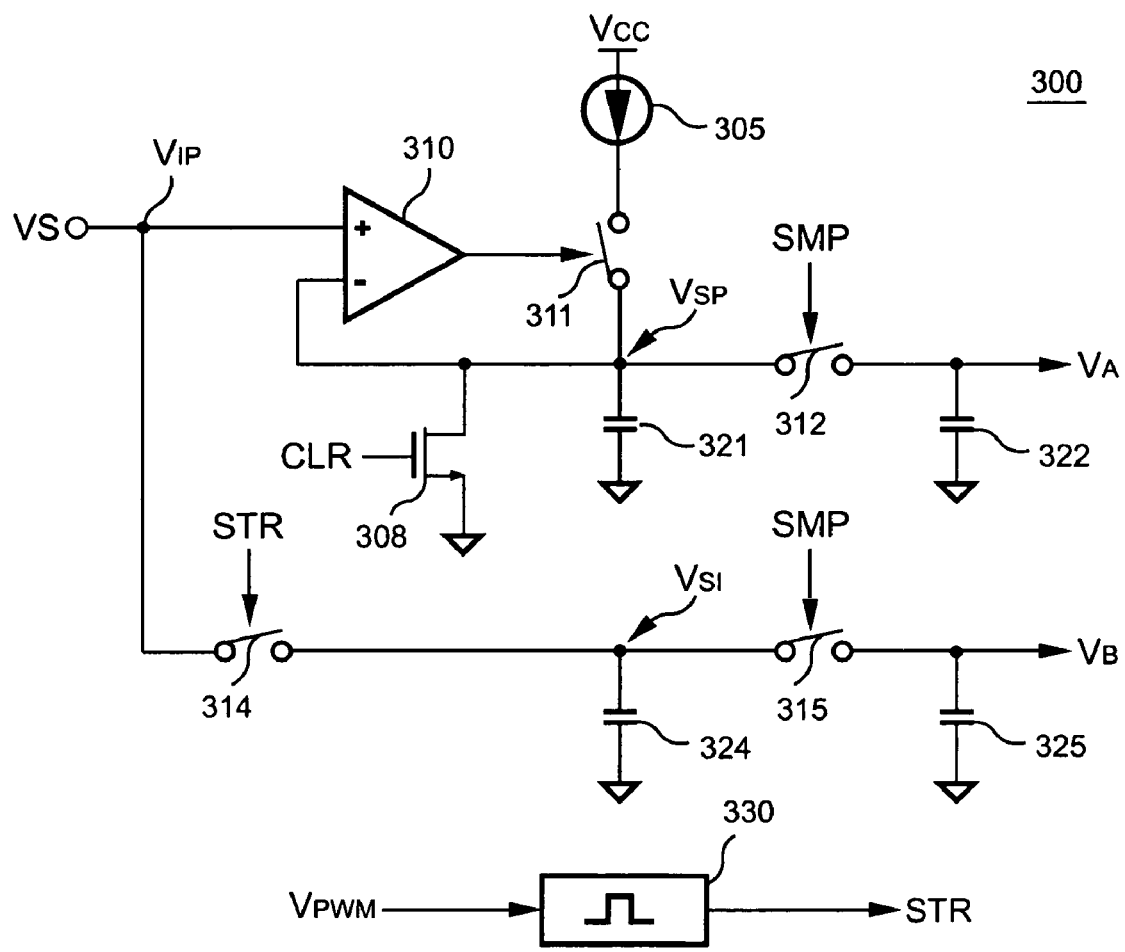
FIG. 10 shows a circuit diagram of a waveform detector according to one embodiment of the present invention.

Referring to FIG. 10, it illustrates a circuit diagram of the waveform detector 300 according to one embodiment of the present invention. A second comparator 310 has a positive input coupled to the current-sense terminal VS of the controller 70. The value of the primary side switching current signal $V_{IP}$ is proportional to the value of the primary side switching current $I_P$. A first capacitor 321 is used to hold the peak value of the primary side switching current signal $V_{IP}$. A negative input of the second comparator 310 is coupled to the first capacitor 321. A first constant current source 305 is coupled to the supply voltage $V_{CC}$ and applied to charge the first capacitor 321. A first switch 311 is coupled between the first constant current source 305 and the first capacitor 321. The first switch 311 is turned on/off by an output signal of the second comparator 310. A peak signal $V_{SP}$ is thus generated across the first capacitor 321. The peak signal $V_{SP}$ is proportional to the sum current of $I_{PA}$ and $I_{PB}$. A first transistor 308 is coupled in parallel with the first capacitor 321 to discharge the first capacitor 321. The gate of the first transistor 308 receives the clear signal CLR. The drain of the first transistor 308 is connected to the first capacitor 321. The source of the first transistor 308 is coupled to the ground. A third switch 312 is coupled between the first capacitor 321 and a third capacitor 322. The third switch 312 controlled by the sample signal SMP is used for periodically sampling the peak signal $V_{SP}$ from the first capacitor 321 to the third capacitor 322. Then the first current-waveform signal $V_A$ is obtained across the third capacitor 322.

A second switch 314 is coupled between the current-sense terminal VS and a second capacitor 324. The second capacitor 324 is used to hold the initial value of the primary side switching current signal $V_{IP}$. An initial signal $V_{SI}$ is therefore generated across the second capacitor 324. The initial signal $V_{SI}$ is proportional to the value of the current $I_{PB}$. A fourth switch 315 is coupled between the second capacitor 324 and a fourth capacitor 325. The fourth switch 315 also controlled by the sample signal SMP serves to periodically sample the initial signal $V_{SI}$ from the second capacitor 324 to the fourth capacitor 325. Then the second current-waveform signal $V_B$ is generated across the fourth capacitor 325.

The switching signal $V_{PWM}$ is transmitted to a third pulse generator 330 to generate a store signal STR. The store signal STR controls the second switch 314 to sample the initial value of the primary side switching current signal $V_{IP}$. Therefore the store signal STR is generated in response to the rising edge of a delayed switching signal. The delayed switching signal is generated in response to a rising edge of the switching signal $V_{PWM}$ after the delay time. The delay time serves to avoid sampling from the interference of the switching spike.

Figure 11:
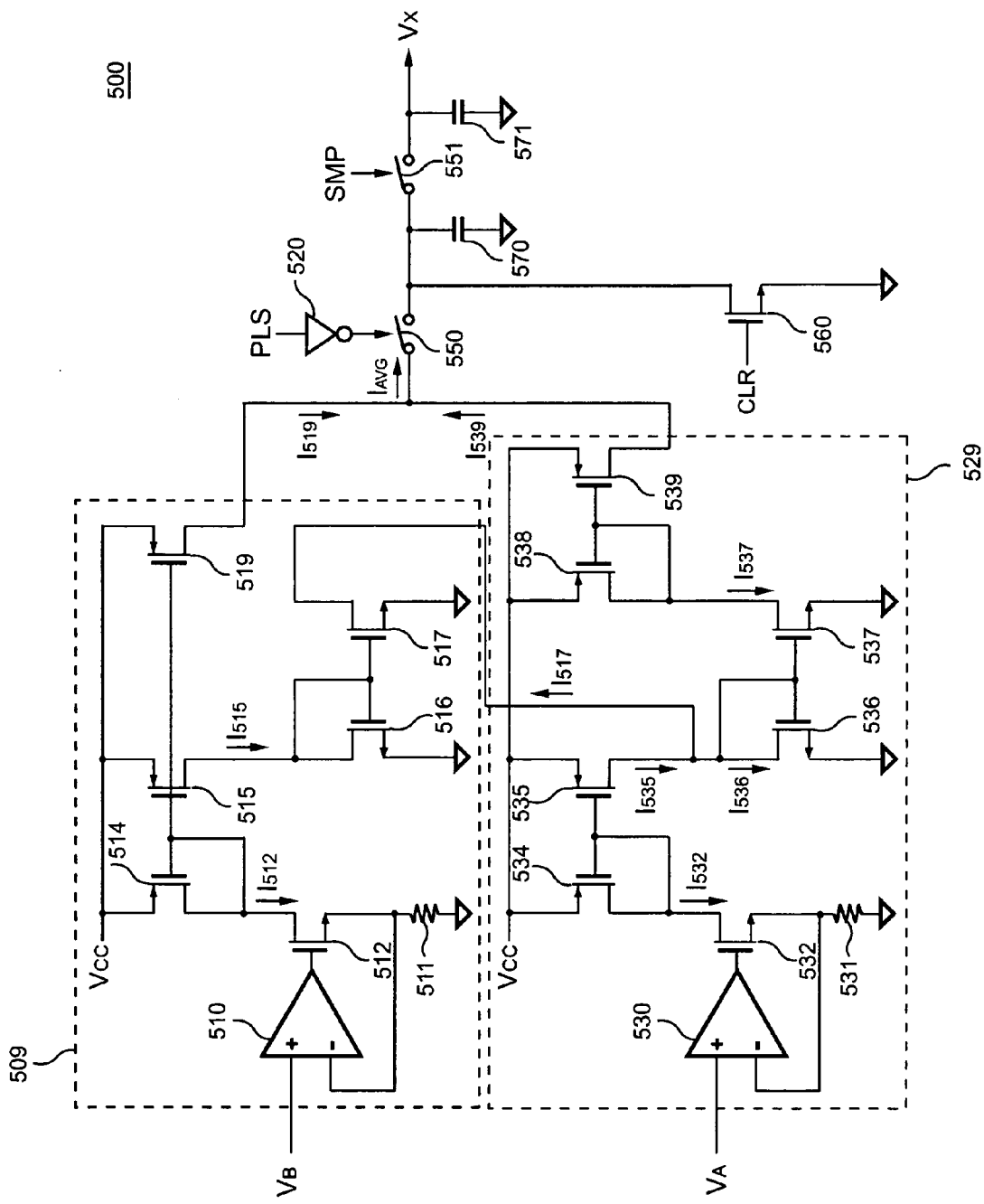
FIG. 11 shows a circuit diagram of an integrator according to one embodiment of the present invention.

Referring to FIG. 11, it illustrates a circuit diagram of an integrator 500 according to one embodiment of the present invention. A first V-to-I converter 509 includes a first timing operational amplifier 510, a first timing resistor 511, a first timing transistor 512, a first current mirror and a second current mirror to generate a first programmable charge current $I_{519}$ in response to the voltage of the second current-waveform signal $V_B$. The first current mirror includes transistors 514, 515, 519. The second current mirror includes transistors 516, 517. A positive input of the first timing operational amplifier 510 is supplied with the second current-waveform signal $V_B$. A negative input of the first timing operational amplifier 510 is connected to the source of the first timing transistor 512. An output of the first timing operational amplifier 510 is coupled to the gate of the first timing transistor 512. The drain of the first timing transistor 512 outputs a first programmable current $I_{512}$. The first timing resistor 511 is coupled between the source of the first timing transistor 512 and the ground. The first current mirror is used to produce a first mirror current $I_{515}$ and the first programmable charge current $I_{519}$ by mirroring the first programmable current $I_{512}$. The sources of the transistors 514, 515, 519 are coupled to the supply voltage $V_{CC}$. The gates of the transistors 514, 515, 519 and the drain of the transistor 514 are coupled together. The drain of the transistor 514 is coupled to the drain of the first timing transistor 512. The drains of the transistors 515, 519 generate the first mirror current $I_{515}$ and the first programmable charge current $I_{519}$ respectively. The second current mirror is used to generate a second mirror current $I_{517}$ by mirroring the first mirror current $I_{515}$. The sources of the transistors 516, 517 are coupled to the ground. The gates of the transistors 516, 517 and the drain of the transistor 516 are coupled together.

The drain of the transistor 516 is coupled to the drain of the transistor 515. The drain of the transistor 517 generates the second mirror current $I_{517}$.

A second V-to-I converter 529 includes a second timing operational amplifier 530, a second timing resistor 531, a second timing transistor 532, a third current mirror, a fourth current mirror and a fifth current mirror for generating a second programmable charge current $I_{539}$ in response to the voltage of the first current-waveform signal $V_A$ and the second current-waveform signal $V_B$. The third current mirror, the fourth current mirror and the fifth current mirror include a plurality of transistors 534~539. A positive input of the second timing operational amplifier 530 is supplied with the first current-waveform signal $V_A$. A negative input of the second timing operational amplifier 530 is connected to the source of the second timing transistor 532. An output of the second timing operational amplifier 530 is connected to the gate of the second timing transistor 532. The drain of the second timing transistor 532 outputs a second programmable current $I_{532}$. The second timing resistor 531 is coupled between the source of the second timing transistor 532 and the ground.

The third current mirror includes transistors 534, 535 for producing a third mirror current $I_{535}$ by mirroring the second programmable current $I_{532}$. The sources of the transistors 534, 535 are coupled to the supply voltage $V_{CC}$. The gates of the transistors 534, 535 and the drains of the transistors 534, 532 are coupled together. The drain of the transistor 535 generates the third mirror current $I_{535}$. The fourth current mirror includes transistors 536, 537 for producing a fourth mirror current $I_{537}$ in response to the third mirror current $I_{535}$ and the second mirror current $I_{517}$. The sources of the transistors 536, 537 are coupled to the ground. The gates of the transistors 536, 537 and the drain of the transistor 536 are coupled together. The drain of the transistor 536 is coupled to the drains of the transistors 535, 517. The drain of the transistor 537 generates the fourth mirror current $I_{537}$.

The fourth mirror current $I_{537}$ can be expressed by $I_{537}=I_{535}-I_{517}$. The geometric size of the transistor 536 is twice the size of the transistor 537. Therefore the fourth mirror current $I_{537}$ is the current $I_{536}$ divided by 2. The fifth current mirror includes transistors 538, 539 for generating the second programmable charge current $I_{539}$ by mirroring the fourth mirror current $I_{537}$. The sources of the transistors 538, 539 are coupled to the supply voltage $V_{CC}$. The gates of the transistors 538, 539 and the drains of the transistors 538, 537 are coupled together. The drain of the transistor 539 generates the second programmable charge current $I_{539}$. The drains of the transistors 519, 539 are coupled together for generating the average current signal $I_{AVG}$ by summing the first programmable charge current $I_{519}$ and the second programmable charge current $I_{539}$. The average current signal $I_{AVG}$ can be expressed by, $$I_{AVG} = \frac{V_B}{R_{511}} + \frac{\left(\frac{V_A}{R_{531}} - \frac{V_B}{R_{511}}\right)}{2} \quad (15)$$

The first timing resistor 511, the second timing resistor 531 and a timing capacitor 570 determine the time constant of the integrator 500, in which the second timing resistor 531 is correlated to the first timing resistor 511. As the resistance of the second timing resistor 531 is set equal to the resistance of the first timing resistor 511, the equation (14) can be thus rewritten as, $$I_{AVG} = \frac{1}{R_{511}} \times \left(V_B + \frac{V_A - V_B}{2}\right) \quad (16)$$

The fifth switch 550 is coupled between the drains of the transistor 519, 539 and the timing capacitor 570. The on/off of the fifth switch 550 is controlled by the oscillation signal PLS through an inverter 520 that is represented by the inverse oscillation signal /PLS. A third transistor 560 is coupled in parallel with the timing capacitor 570 to discharge the timing capacitor 570. The gate of the third transistor 560 is supplied with the clear signal CLR. The source of the third transistor 560 is coupled to the ground. The drain of the third transistor 560 is coupled to the timing capacitor 570. A sixth switch 551 is coupled between the timing capacitor 570 and an output capacitor 571. The sixth switch 551 controlled by the sample signal SMP periodically samples the voltage across the timing capacitor 570 to the output capacitor 571. The integrated signal $V_X$ is therefore generated across the output capacitor 571. The integrator 500 generates the integrated signal $V_X$ by integrating the average current signal $I_{AVG}$ with a time signal that is the inverse oscillation signal /PLS. The integrated signal $V_X$ can be expressed by, $$V_X = \frac{1}{R_{511}C_{570}} \times \left(V_B + \frac{V_A - V_B}{2}\right) \times T_S \quad (17)$$

According to the preferred embodiment illustrated in FIGS. 5, 7, 10 and 11, the integrated signal $V_X$ is correlated to the secondary side switching current $I_S$ and the output current $I_O$ of the power supply. Thus, the equation (11) can be rewritten as, $$V_X = m \times \frac{T_{NS}}{T_{NP}} \times R_S \times I_O \quad (18)$$

where m can be expressed, $$m = D^2 \times \frac{R_{210} \times C_{215}}{R_{511} \times C_{570}} \times \frac{V_{OSC}}{V_{REF2}} \quad (19)$$

where D represents the maximum duty cycle of the switching signal $V_{PWM}$, which is determined by the pulse width of the inverse oscillation signal /PLS and the switching period T.

The resistance $R_{511}$ of the first timing resistor 511 is correlated to the resistance $R_{210}$ of the third timing resistor 210. The capacitance $C_{570}$ of the timing capacitor 570 is correlated to the capacitance $C_{215}$ of the fifth capacitor 215. Therefore, the integrated signal $V_X$ is proportional to the output current $I_O$ of the power supply.

It will be apparent to those skilled in the art that various modifications and variations can be made to the structure of the present invention without departing from the scope or spirit of the invention. In view of the foregoing, it is intended that the present invention covers modifications and variations of this invention provided they fall within the scope of the following claims and their equivalents.

What is claimed is:

1. A controller for controlling an output current at a primary-side of a power supply, comprising;
   a waveform detector, coupled to a current sense device of said power supply to generate a current-waveform signal by sampling a primary side switching current signal, wherein said primary side switching current signal is generated by said current sense device from a primary side switching current of a transformer of said power supply;

first and second control circuits, said second control circuit generating an oscillation signal to determine a switching frequency of a switching signal, wherein said switching signal is used for switching said transformer and regulating the output of said power supply;

an integrator, generating an average current signal in response to said current-waveform signal and further generating an integrated signal by integrating said average current signal with a time signal, wherein said time signal is generated in accordance with said oscillation signal; and, said first control circuit including:
an error amplifier, having an operational amplifier and a first reference voltage for amplifying said integrated signal;
a first comparator, generating a reset signal for controlling a pulse width of said switching signal in reference to an output signal of said error amplifier, wherein said output current of said power supply is regulated in response to said first reference voltage; and
a PWM circuit, generating said switching signal in response to said reset signal and said oscillation signal.

2. The controller as recited in claim 1, wherein a time constant of said integrator is correlated with a switching period of said switching signal.

3. The controller as recited in claim 1, said waveform detector comprising:
a second comparator, having a positive input coupled to said current-sense device to receive said primary side switching current signal, wherein a value of said primary side switching current signal is proportional to a value of said primary side switching current;
a first capacitor, holding a peak value of said primary side switching current signal, wherein a negative input of said second comparator is coupled to said first capacitor;
a first constant current source, charging said first capacitor;
a first switch, coupled between said fist constant current source and said first capacitor, wherein said first switch is turned on/off by an output signal of said second comparator;
a first transistor, coupled in parallel with said first capacitor for discharging said first capacitor;
a second capacitor, holding an initial value of said primary side switching current signal;
a second switch, coupled between said current-sense device and said second capacitor, wherein said second switch is turned on/off by a store signal, wherein said store signal is a pulse signal generated in response to the rising edge of a delayed switching signal, wherein said delayed switching signal is generated in response to the rising edge of said switching signal after a delay time;
a third capacitor;
a third switch, coupled between said first capacitor and said third capacitor for periodically sampling a voltage across said first capacitor to said third capacitor;
a fourth capacitor; and
a fourth switch, coupled between said second capacitor and said fourth capacitor for periodically sampling a voltage across said second capacitor to said fourth capacitor, wherein said current-waveform signal is obtained across said third capacitor and said fourth capacitor, wherein said current-waveform signal includes a first current-waveform signal generated by said third capacitor and a second current-waveform signal generated by said fourth capacitor.

4. The controller as recited in claim 1, said integrator comprising:
a first V-to-I converter, having a first timing operational amplifier, a first timing resistor, a first timing transistor and a plurality of transistors for generating a first programmable charge current in response to a second current-waveform signal of said current-waveform signal, wherein said first timing operational amplifier, said first timing resistor and said transistors of said first V-to-I converter are coupled to said first timing transistor;
a second V-to-I converter, coupled to said first V-to-I converter and having a second timing operational amplifier, a second timing resistor, a second timing transistor and a plurality of transistors for generating a second programmable charge current in response to a first current-waveform signal and said second current-waveform signal of said current-waveform signal, wherein said second timing operational amplifier, said second timing resistor and said transistors of said second V-to-I converter are coupled to said second timing transistor;
a timing capacitor;
a fifth switch, having a first terminal supplied with said average current signal and a second terminal coupled to said timing capacitor, wherein said fifth switch is turned on/off by said time signal, wherein said average current signal is generated by summing said first programmable charge current and said second programmable charge current;
a third transistor, coupled in parallel with said timing capacitor to discharge said timing capacitor;
an output capacitor; and
a sixth switch, coupled between said timing capacitor and said output capacitor for periodically sampling a voltage from said timing capacitor to said output capacitor, wherein said integrated signal is obtained across said output capacitor.

5. The controller as recited in claim 4, wherein said first timing resistor of said first V-to-I converter is correlated to said second timing resistor of said second V-to-I converter.

6. The controller as recited in claim 1, said second control circuit comprising:
a third V-to-I converter, having a third timing operational amplifier, a third timing resistor and a third timing transistor for generating a reference current in response to a second reference voltage, wherein said third timing operational amplifier and said third timing resistor are coupled to said third timing transistor, wherein said third timing operational amplifier receives said second reference voltage;
a sixth current mirror, generating a second control circuit charge current in response to said reference current;
a seventh current mirror, generating a second control circuit discharge current in response to said reference current;
a fifth capacitor;
a seventh switch, coupled between said sixth current mirror and said fifth capacitor;

a eighth switch, coupled between said seventh current mirror and said fifth capacitor;

a third comparator, having a positive input coupled to said fifth capacitor, wherein an output of said third comparator generates said oscillation signal;

a ninth switch, coupled between a high-threshold voltage and a negative input of said third comparator;

a tenth switch, coupled between a low-threshold voltage and said negative input of said third comparator; and an inverter, having an input coupled to said output of the third comparator, wherein an output of said inverter generates an inverse oscillation signal for controlling the on/off of said seventh switch and said ninth switch;

wherein said eighth switch and said tenth switch are turned on/off by said oscillation signal.

7. A controller for controlling an output current at a primary side of a power supply, comprising:

a waveform detector, coupled to a current sense device of said power supply to generate a current-waveform signal by sampling a primary side switching current signal of a transformer of said power supply through said current-sense device;

an integrator, generating an integrated signal in response to said current-waveform signal and a time signal;

a first control circuit, including a first reference voltage to generate a switching signal in response to an oscillation signal, said integrated signal and said first reference voltage, wherein said switching signal is utilized to switch said transformer and regulate the output current of said power supply in accordance with said first reference voltage; and a second control circuit, generating said oscillation signal periodically;

wherein said time signal is generated in accordance with said oscillation signal.

8. The controller as recited in claim 7, wherein a time constant of said integrator is correlated with a switching period of said switching signal.

9. The controller as recited in claim 7, said waveform detector comprising:

a second comparator, having a positive input coupled to said current-sense device to receive said primary side switching current signal, wherein a value of said primary side switching current signal is proportional to a value of a primary side switching current of said transformer;

a first capacitor, holding a peak value of said primary side switching current signal, wherein a negative input of said second comparator is coupled to said first capacitor;

a first constant current source, charging said first capacitor;

a first switch, coupled between said first constant current source and said first capacitor, wherein said first switch is turned on/off by an output signal of said second comparator;

a first transistor, coupled in parallel with said first capacitor for discharging said first capacitor;

a second capacitor, holding an initial value of said primary side switching current signal;

a second switch, coupled between said current-sense device and said second capacitor, wherein said second switch is turned on/off by a store signal, wherein said store signal is a pulse signal generated in response to the rising edge of a delayed switching signal, wherein said delayed switching signal is generated in response to the rising edge of said switching signal after a delay time;

a third capacitor;

a third switch, coupled between said first capacitor and said third capacitor for periodically sampling a voltage across said first capacitor to said third capacitor;

a fourth capacitor; and a fourth switch, coupled between said second capacitor and said fourth capacitor for periodically sampling a voltage across said second capacitor to said fourth capacitor, wherein said current-waveform signal is obtained across said third capacitor and said fourth capacitor, wherein said current-waveform signal includes a first current-waveform signal generated by said third capacitor and a second current-waveform signal generated by said fourth capacitor.

10. The controller as recited in claim 7, said integrator comprising:

a first V-to-I converter, having a first timing operational amplifier, a first timing resistor, a first timing transistor and a plurality of transistors for generating a first programmable charge current in response to a second current-waveform signal of said current-waveform signal, wherein said first timing operational amplifier, said first timing resistor and said transistors of said first V-to-I converter are coupled to said first timing transistor;

a second V-to-I converter, having a second timing operational amplifier, a second timing resistor, a second timing transistor and a plurality of transistors for generating a second programmable charge current in response to a first current-waveform signal and said second current-waveform signal of said current-waveform signal, wherein said second timing operational amplifier, said second timing resistor and said transistors of said second V-to-I converter are coupled to said second timing transistor;

a timing capacitor;

a fifth switch, having a first terminal supplied with an average current signal and a second terminal coupled to said timing capacitor, wherein said fifth switch is turned on/off by said time signal, wherein said average current signal is generated by summing said first programmable charge current and said second programmable charge current;

a third transistor, coupled in parallel with said timing capacitor to discharge said timing capacitor;

an output capacitor; and a sixth switch, coupled between said timing capacitor and said output capacitor for periodically sampling a voltage across said timing capacitor to said output capacitor, wherein said integrated signal is obtained across said output capacitor.

11. The controller as recited in claim 10, wherein said first timing resistor of said first V-to-I converter is correlated to said second timing resistor of said second V-to-I converter.

12. The controller as recited in claim 7, said second control circuit comprising:

a third V-to-I converter, having a third timing operational amplifier, a third timing resistor and a third timing transistor for generating a reference current in response to a second reference voltage, wherein said third timing operational amplifier and said third timing resistor are coupled to said third timing transistor, wherein said third timing operational amplifier receives said second reference voltage;

a sixth current mirror, generating a second control circuit charge current in response to said reference current;

a seventh current mirror, generating a second control circuit discharge current in response to said reference current;

a fifth capacitor;

a seventh switch, coupled between said sixth current mirror and said fifth capacitor;

a eighth switch, coupled between said seventh current mirror and said fifth capacitor;

a third comparator, having a positive input coupled to said fifth capacitor, wherein an output of said third comparator generates said oscillation signal;

a ninth switch, coupled between a high-threshold voltage and a negative input of said third comparator;

a tenth switch, coupled between a low-threshold voltage and said negative input of said third comparator; and an inverter, having an input coupled to said output of said the third comparator, wherein an output of said inverter generates an inverse oscillation signal for controlling the on/off of said seventh switch and said ninth switch;

wherein said eighth switch and said tenth switch are turned on/off by said oscillation signal.

13. A controller for controlling an output current at a primary side of a power supply, comprising;

a waveform detector, generating a current-waveform signal in response to a primary side switching current signal of a transformer of said power supply;

an integrator, generating an integrated signal in accordance with said current-waveform signal and an oscillation signal;

a first control circuit, including a first reference voltage to generate a switching signal in response to said oscillation signal, said integrated signal and said first reference voltage for controlling said output current of the power supply; and a second control circuit, generating said oscillation signal for determining a switching frequency of said switching signal.

14. The controller as recited in claim 13, wherein a time constant of said integrator is correlated with said switching signal.

15. The controller as recited in claim 13, said waveform detector comprising:

a second comparator, coupled to detect said primary side switching current signal;

a first capacitor, holding a peak value of said primary side switching current signal;

a second capacitor, holding an initial value of said primary side switching current signal;

a second switch, coupled to between said primary side switching current signal and said second capacitor to sample said primary side switching current signal to said second capacitor in response to said switching signal;

a third capacitor;

a third switch, coupled between said first capacitor and said third capacitor for periodically sampling a voltage across said first capacitor to said third capacitor;

a fourth capacitor; and a fourth switch, coupled between said second capacitor and said fourth capacitor for periodically sampling a voltage across said second capacitor to said fourth capacitor, wherein said current-waveform signal is obtained across said third capacitor and said fourth capacitor, wherein said current-waveform signal includes a first-A signal generated by said third capacitor and a first-B signal generated by said fourth capacitor.

16. The controller as recited in claim 13, said integrator comprising:

a first V-to-I converter, having a first timing operational amplifier, a first timing resistor, a first timing transistor and a plurality of transistors for generating a first programmable charge current in response to a first-B signal of said current-waveform signal, wherein said first timing operational amplifier, said first timing resistor and said transistors of said first V-to-I converter are coupled to said first timing transistor;

a second V-to-I converter, having a second timing operational amplifier, a second timing resistor, a second timing transistor and a plurality of transistors for generating a second programmable charge current in response to a first-A signal and said fist B-signal of said current-waveform signal, wherein said second timing operational amplifier, said second timing resistor and said transistors of said second V-to-I converter are coupled to said second timing transistor;

a timing capacitor;

a fifth switch, having a first terminal supplied with an average current signal and a second terminal coupled to said timing capacitor, wherein said fifth switch is turned on/off in response to said oscillation signal, wherein said average current signal is generated by summing said first programmable charge current and said second programmable charge current;

an output capacitor; and a sixth switch, coupled between said timing capacitor and said output capacitor for periodically sampling a voltage across said timing capacitor to said output capacitor, wherein said integrated signal is obtained across said output capacitor.

17. The controller as recited in claim 16, wherein said first timing resistor of said first V-to-I converter is correlated to said second timing resistor of said second V-to-I converter.

18. The controller as recited in claim 13, said second control circuit comprising:

a third V-to-I converter, having a third timing operational amplifier, a third timing resistor and a third timing transistor for generating a reference current in response to a second reference voltage, wherein said third timing operational amplifier and said third timing resistor are coupled to said third timing transistor, wherein said third timing operational amplifier receives said second reference voltage;

a sixth current mirror, generating a second control circuit charge current in response to said reference current;

a seventh current mirror, generating a second control circuit discharge current in response to said reference current;

a fifth capacitor;

a seventh switch, coupled between said sixth current mirror and said fifth capacitor;

a eighth switch, coupled between said seventh current mirror and said fifth capacitor;

a third comparator, having a positive input coupled to said fifth capacitor, wherein an output of said third comparator generates said oscillation signal;

a ninth switch, coupled between a high-threshold voltage and a negative input of said third comparator;

a tenth switch, coupled between a low-threshold voltage and said negative input of said third comparator; and an inverter, having an input coupled to said output of said third comparator, wherein an output of said inverter generates an inverse oscillation signal for controlling the on/off of said seventh switch and said ninth switch;

wherein said eighth switch and said tenth switch are turned on/off by said oscillation signal.

* * * * *